United States Patent [19]

Münkel

[11] Patent Number: 4,838,711
[45] Date of Patent: Jun. 13, 1989

[54] BEARING FOR AN EXHAUST-GAS TURBOCHARGER

[75] Inventor: Uwe Münkel, Frankenthal, Fed. Rep. of Germany

[73] Assignee: Kuehnle, Kopp & Kausch, Fed. Rep. of Germany

[21] Appl. No.: 179,290

[22] Filed: Apr. 8, 1988

[30] Foreign Application Priority Data

Apr. 11, 1987 [DE] Fed. Rep. of Germany ....... 3712444

[51] Int. Cl.$^4$ ............................................. F16C 27/02
[52] U.S. Cl. .................... 384/215; 384/218; 384/901
[58] Field of Search .............. 384/215, 218, 901, 398, 384/399, 373, 114

[56] References Cited

U.S. PATENT DOCUMENTS

| | | | |
|---|---|---|---|
| 3,811,741 | 5/1974 | McInerney et al. | |
| 4,027,931 | 6/1977 | Streifert | 384/215 |
| 4,560,325 | 12/1985 | Yoshioka et al. | 384/901 |
| 4,605,316 | 8/1986 | Utecht | 384/215 |
| 4,738,548 | 4/1988 | Zloch et al. | 384/901 |

FOREIGN PATENT DOCUMENTS 718715 9/1965 Canada.

OTHER PUBLICATIONS

Richter et al., *Bauelemente der Feinmechanik*, Verlag Technik Berlin, 1952, pp. 224–225.

Primary Examiner—Lenard A. Footland
Attorney, Agent, or Firm—Foley & Lardner, Schwartz, Jeffery, Schwaab, Mack, Blumenthal & Evans

[57] ABSTRACT

A bearing for an exhaust-gas turbocharger including a sleeve 26 which is arranged in a bore 36 of a bearing housing 6 and which is prevented from rotating. The sleeve 26 contains, at each of its two axial end regions, an inner and an outer bearing face 34, 32 and at least two openings 28 between the end regions. Sleeve rotation is prevented in a functionally reliable manner and at a low construction cost by a preferably annular spring element 50 which is elastic in the circumferential direction and which engages by means of a axially bent first end 52 in a groove 54 in the sleeve 26. The bearing housing 6 has a recess 56 which opens into the bore of the bearing housing radially relative to the shaft 14 and in which the radially outwardly bent second end 58 of the spring element 50 engages.

16 Claims, 1 Drawing Sheet

BEARING FOR AN EXHAUST-GAS TURBOCHARGER

BACKGROUND OF THE INVENTION

This invention relates to a bearing for an exhaust-gas turbocharger with a sleeve which is arranged in a floating manner in a bore of a bearing housing for the radial mounting of a shaft and which is prevented from rotating by means arranged in the bearing housing; the sleeve having inner and outer bearing faces at each of its two axial end regions and having at least two openings provided axially between the end regions.

U.S. Pat. No. 3,811,741 discloses a bearing for an exhaust-gas turbocharger, which has a sleeve arranged in a floating manner in a bore of a bearing housing. A retaining pin is fastened in the bearing housing and radially engages in a sleeve perforation designed as a radial bore. The sleeve contains further perforations, through which lubricant fed to the bearing faces can flow away. These perforations are also designed as bores, and the sleeve as a whole has a comparatively large mass. The retaining pin rests in the associated bore of the sleeve over a relatively large area, with the result that the free movability of the sleeve is appreciably reduced not only in the direction of rotation, but also in other degrees of freedom. This gives rise to difficulties with respect to the vibration behavior and with respect to operating reliability and length of service life at rotational speeds above 150,000 revolutions per minute. Such high rotational speeds are necessary primarily for so-called small exhaust-gas turbochargers which are used for engines with displacements of up to approximately 1.5 liters and a maximum of 2 liters. In addition, in view of the frictional losses at high rotational speeds, the shafts of exhaust-gas turbochargers of this type are made extremely thin and therefore are highly flexible.

Canadian Pat. No. 718,715 discloses a bearing for an exhaust-gas turbocharger, the bearing sleeve of which has teeth at one axial end. Connected to the bearing housing is a pressure disc with teeth which engage the teeth of the bearing sleeve to prevent rotation of the sleeve. Furthermore, the free moveability of the bearing sleeve is also at the very least restricted in other degrees of freedom. Thus, the other two rotational degrees of freedom, specifically about the spatial axes perpendicular to the longitudinal axis, and the translational degree of freedom in the direction of the longitudinal axis, are restricted to an appreciable extent. A high surface pressure is unavoidable at the contact faces of the teeth of the bearing sleeve and the pressure disc. As a result of frictional corrosion, there is a danger, which increases at higher rotational speeds, that the teeth will be destroyed. Free moveability or floating of the sleeve is not satisfactorily achieved. Furthermore, the sleeve contains two small bores in the center for the lubricant and has a comparatively large mass. This previously known exhaust-gas turbocharger is only designed for rotational speeds of up to approximately 80,000 revolutions per minute.

The German reference book *Bauelemente der Feinmechanik* ("Precision engineering components") by O. Richter and R. V. Voss, Verlag Technik Berlin, 1952, pages 224 to 225, describes wire clips or retaining rings which are arranged in longitudinal grooves of a shaft and which serve to axially retain a component arranged on the shaft. The retaining ring projects beyond the peripheral surface of the shaft, and the component can come to rest with an associated axial end face against the projecting part of the retaining ring. No connection between the component and the shaft is achieved by the retaining ring.

In exhaust-gas turbochargers of this type which operate at high rotational speeds, further difficulties arise as a result of an effect known as "oil whip", which can occur in speed ranges higher than twice the value of the first or second critical rotational speed. This effect causes the shaft to be excited in such a way that the shaft ends execute a second rotary movement about the geometrical axis which is superposed on the shaft rotation. That part of the shaft located between the bearing faces of the bearing bushings is deflected in the opposite direction. This is referred to as the so-called "whiplash effect". If the superposed rotary movement occurs at half the rotational speed of the shaft, metallic contact can take place between the shaft and the bearing bushing, and this can result in complete loss of the supporting capacity of the bearing and in destruction of the bearing. The deformation of the shaft which occurs can lead to unacceptable edge pressures at the ends of the bearing bushings. Floating bearing bushings can each execute slight radial and tilting movements independently of one another. However, in small exhaust-gas turbochargers which are intended to rotate at very high speeds, particularly above 150,000 revolutions per minute, the aforementioned measures are not sufficient to make it possible to obtain an operationally reliable bearing. Exhaust-gas turbochargers of this type have very small rotating masses and at the same time a minimum shaft diameter, and the unbalanced load caused by the deformation of the shaft can amount to a hundred times the value of the mass of the rotor. The resulting sagging of the shaft or "whiplash" effect which then arises can become unacceptably high, with the result that not only can the aforementioned mechanical damage occur, but also a large amount of noise can be generated.

Commonly owned, copending U.S. patent application Ser. No. 001,909 filed Jan. 9, 1987 discloses a bearing in which the sleeve is prevented from rotating by means of a retaining pin, the tip of which rests on the outer face of one of the narrow webs joining the bearing bushings. Because of manufacturing conditions and limitations, difficulties can arise with respect to the arrangement of the retaining pin.

SUMMARY OF THE INVENTION

The object of the invention is therefore to provide an exhaust-gas turbocharger bearing which, instead of a retaining pin, uses other means for preventing the sleeve from rotating.

Another object of the invention is to provide an exhaust-gas turbocharger bearing in which the bearing sleeve has a low mass in terms of its vibration behavior.

It is also an object of the invention to provide an exhaust-gas turbocharger bearing which assures quiet running even at high speeds.

A further object of the invention is to provide an exhaust-gas turbocharger bearing in which the rotation preventing means is to have elastic compliance, above all in the direction of rotation, and will allow damping.

Yet another object of the invention is to provide an exhaust-gas turbocharger bearing which makes it possible to equip the turbocharger with an extremely thin or highly flexible shaft.

A still further object of the invention is to provide an exhaust-gas turbocharger bearing in which frictional losses are kept low.

An additional object of the invention is to provide an exhaust-gas turbocharger bearing which assures stable rotor dynamics and quiet operation even with small rotating masses, in particular of the turbine wheel, the thin shaft and the compressor impeller.

These an other objects of the invention are achieved by providing a bearing for an exhaust-gas turbocharger comprising a bearing housing defining a bore and a recess opening into the bore, a sleeve arranged in a floating manner in the bore for radially mounting a turbocharger shaft, the sleeve having a bushing portion with an inner bearing face and an outer bearing face at each of its two axial end regions and webs joining the bushing portions defining at least two openings axially between the bushing portions, and means arranged in the bearing housing for preventing rotation of the sleeve around the shaft, the rotation preventing means comprising an at least substantially annular spring element which is elastic in the circumferential direction and which has a first end which engages in a groove in said sleeve and a second end which engages in the recess in the bearing housing.

According to the present invention, it is proposed that, to prevent the sleeve from rotating, a spring element be provided which at one end engages in a groove of the sleeve, that the spring element be made annular and elastic in the circumferential direction, and that the bearing housing have a recess which opens in the radial direction relative to the shaft in which the other end of the spring element engages.

The exhaust-gas turbocharger bearing of the present invention has a simple construction and yet is characterized by high operating reliability. The bearing of the invention makes it possible for bearing damage or disturbing noises to be reliably prevented even at high rotational speeds greater than 150,000 revolutions per minute. The turbocharger shaft can have an extremely small diameter with a view to achieving low bearing friction losses, and stable operation is achieved without the disadvantages described above. The spring element provided to prevent the sleeve from rotating is elastically deformable, thus reliably preventing a destruction of material on the contact face of the bearing sleeve. This measure is essential in terms of the vibrations of the hydrodynamically mounted rotor at the high speeds to be attained. In particular, when the retention means are inserted fixedly in the bearing housing, imbalance and self-excited vibrations lead to frictional corrosion, also known as "fretting", at the contact faces of the retaining element and of the bearing bushing. Such a destruction of material is reliably prevented by the elastically deformable retaining element of the present invention. The spring element is annular in form and is resiliently elastic in the circumferential direction. Advantageously, the annular spring element extends around virtually the entire circumference, that is to say over as large an angular sector as possible, so that a long spring excursion is available. The spring element is coupled on the one hand to the sleeve and on the other hand to the bearing housing, in such a way that elastic coupling occurs substantially exclusively in the peripheral direction, and moreover free movability is provided in the other degrees of freedom. Furthermore, the resilient retaining element produces an appreciable reduction in the vibration amplitudes, and unacceptably high values are avoided. The spring element is advantageously designed as a retaining ring made of spring-steel wire with two bent ends, one of which is bent radially outwards and engages a recess in the bearing housing and the other of which is bent in the axial direction engages a groove in the sleeve. Because the spring element arranged according to the invention in the bore of the bearing housing rests against the bearing housing, preferably in an annular groove of the bearing housing, it reliably ensures damping will occur as a result of friction. Thus, in accordance with the invention, the spring element or retaining ring serves to prevent rotation of the sleeve.

The comparatively small length of the inner bearing face parallel to the shaft axis contributes to reducing the friction, while the length of the outer bearing face, which according to the invention preferably is larger than the length of the inner bearing face, results in a larger compression oil film, thus reliably ensuring good damping. The connection of the two bearing bushings by means of narrow webs and the wide openings located between the narrow webs ensure an undisturbed outflow of the lubricant or oil. The use of narrow webs with substantially wider openings between them to join the bushings also results in an appreciable reduction in the mass of the sleeve and prevents lubricant which flows out of the bearing gaps towards the center of the sleeve from accumulating so that disadvantageous braking effects due to lubricant accumulations are avoided.

The sleeve or the two bearing bushings do not serve to absorb axial loads and therefore function solely as radial bearings. On the other hand, the absorption of axial forces would impair the free movability or floating of the sleeve. Thus, a known axial bearing, not described here in further detail, is additionally provided for the turbocharger shaft. The spring element provided according to the invention serves solely to fix the sleeve in the direction of rotation of the shaft. According to the invention, only one rotational degree of freedom is cancelled as a result of the spring element, whereas the remaining degrees of freedom, corresponding to the predetermined play of the floating sleeve, are not restricted. The spring element does not cause any restriction in the axial movability of the sleeve.

According to a particularly preferred embodiment the ratio of the length of the inner bearing face parallel to the shaft axis to the length of the outer sleeve face is 0.25 to 0.5:1. Ideal dimensions are thereby obtained, so that, on the one hand, extremely low bearing friction occurs in the region of the inner bearing face and, on the other hand, excellent stability as a result of good compression oil damping is ensured because of the comparatively large outer sleeve face.

According to a further preferred embodiment the ratio of the length of the inner bearing face of each of the two bearing bushings parallel to the shaft axis to the inside diameter of the bushings is 0.3 to 0.5:1. As a result of this design, which is particularly important in view of the extremely thin shaft diameter, bearingfriction losses are minimized.

In another preferred embodiment, the sleeve is prevented from shifting axially at one end of means of the abovedescribed spring element or retaining ring or at the other end by means of a conventional retaining ring, that is to say without rotation-preventing means. Simple and inexpensive production and also free movability of the sleeve are thereby assured. In this invention, the axial thrust is absorbed solely by a separate axial bearing.

In a further preferred embodiment, the sleeve is arranged in the bearing housing in such a way that the webs which join the bushing portions lie essentially in a horizontal plane at the sides of the shaft, and the openings between the webs are oriented upwardly or downwardly. According to the invention, the webs are made relatively narrow and are arranged laterally relative to the shaft. A proper free outflow of oil is ensured by the downwardly oriented opening. Assembly errors can be avoided because of the symmetrical design of the sleeve with two lateral webs. In the sleeve according to the invention, the axial length of the webs is substantially the same as the axial length of the sleeve outer face of each of the respective bushing portions.

BRIEF DESCRIPTION OF THE DRAWINGS

The invention will be explained in further detail hereinafter with reference to an illustrative embodiment depicted in the accompanying drawings, wherein.

DETAILED DESCRIPTION OF A PREFERRED EMBODIMENT

Figure 1:
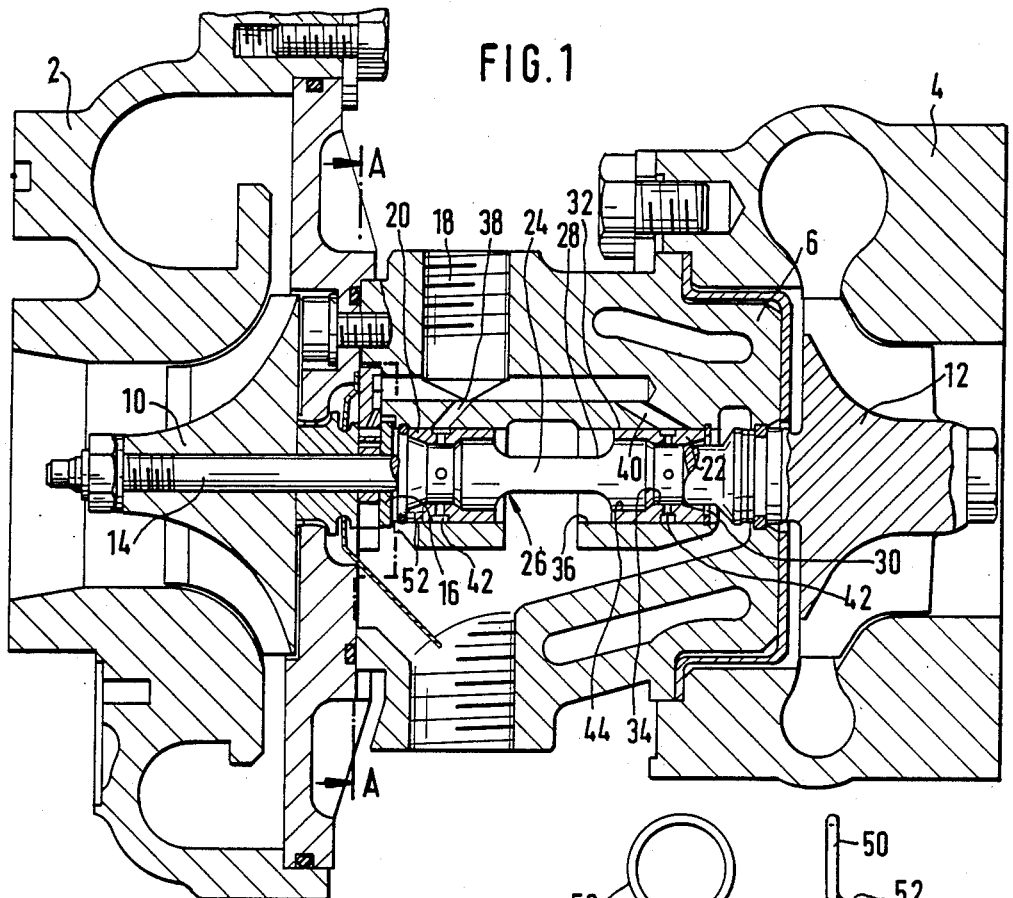
FIG. 1 shows an axial longitudinal section through an exhaust-gas turbocharger according to the present invention.

FIG. 1 shows the compressor housing 2 on the left and the turbine housing 4 on the right, these being connected to one another in a known manner by a bearing housing 6. The compressor impeller 10, like the turbine wheel 12, is arranged fixedly in terms of relative rotation on a shaft 14. An axial bearing 16 serves for axial mounting in the bearing housing 6. Hydraulic oil, particularly from the engine, is fed to the bearing housing 6 through a bore 18, to serve in the usual way to lubricate and cool the bearings.

The shaft 14 has a relatively small diameter and is mounted radially in an inner bore of the bearing housing 6 by means of two bearing bushings 20 and 22 arranged at an axial distance from one another. The two bearing bushings 20 and 22 are integrated with one another by means of two axially extending narrow webs 24 to form a sleeve 26. In the drawing, only one web 24 lying behind the drawing plane is shown. A further web is correspondingly arranged in front of the drawing plane. The sleeve 26 thus is formed with openings 28 between the two respective webs 24. The two webs 24 are each arranged essentially in a radial plane laterally of the shaft 14, and the lubricant can flow away unimpeded through the perforation 28 located at the bottom of the sleeve, so that an accumulation of oil in the central region of the sleeve and losses arising as a result of this are prevented. Furthermore, according to the invention, the two webs 24 have approximately the same length in the axial direction as the outer bearing faces 32 of the two bearing bushings 20 and 22. The sleeve 26 is secured axially by means of a spring element 50 and a retaining ring 30. It is essential that axial mounting of the shaft is effected solely by means of the axial bearing 16, and that the sleeve 26 is arranged in the bearing housing 6 with play between the spring element 50 and the retaining ring 30. The spring element 50 has an axially bent first end 52 which engages in a groove 54 in the sleeve 26. The other end 58 of spring element 50 is anchored in the bearing housing 6 in a way explained hereinafter, so that the spring element functions to prevent the sleeve 26 from rotating. As a result of the elastic compliance of the annular spring element 50, damage to or destruction of the contact faces of the groove 56 of the sleeve 26 is reliably prevented. The spring element 50 is resiliently elastic in the circumferential direction and advantageously extends through an angle of virtually 360° around the axis of rotation or longitudinal axis, thereby achieving a long spring excursion.

As can also be seen, the outer sleeve face or bearing face 32 has a greater axial length than the inner bearing face 34. Thus, between the inner face 36 of the bore of the bearing housing 6 and the sleeve outer face or bearing face 32 there is therefore a compression oil gap which has a substantially larger area and axial length than the inner bearing face 34. According to the invention, a large compression oil film forms in this longer gap, and operationally reliable damping is achieved as a result of this large oil film.

Within the scope of this invention, a bore 38, 40, through which the hydraulic oil is fed, leads to the compression oil gap of each bearing point. The two bearing bushings 20 and 22 each have an outer peripheral groove with four radial bores 42 which are distributed uniformly around the circumference and through which the hydraulic oil reaches the inner bearing faces 34. According to the invention, widened portions 44 of enlarged diameter adjoin the inner bearing faces 34 axially towards the center. These widened portions 44 then merge continuously into the webs 24 which are likewise spaced a corresponding radial distance from the shaft 14. The two widened portions 44 each have an axial length of the same order of magnitude as the length of the inner bearing faces. The inner bearing face 34 is thus substantially smaller than the outer sleeve face 32, and frictional losses can consequently be kept low.

Figure 2:
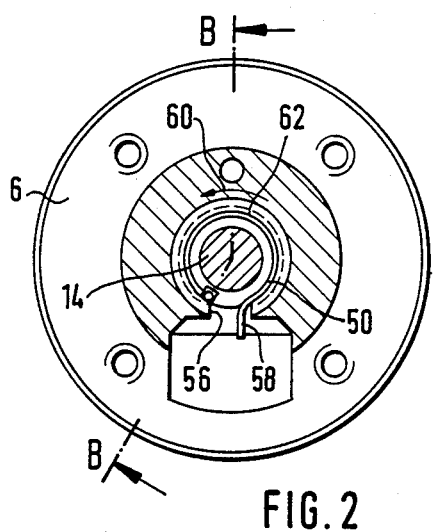
FIG. 2 shows an enlarged sectional view taken along section line A—A in FIG. 1.

FIG. 2 shows a sectional view taken along the section line A—A, the connecting flange of the bearing housing 6 and the shaft 14 being clearly recognizable. The bearing housing 6 has a recess 56 which opens towards the shaft 14, and the radially outwardly bend end 58 of the annular spring element 50 engages in this recess 56. The arrow 60 denotes the direction of rotation of the shaft 14. The spring element 50, which according to the invention is preferably formed as an open ring made of spring-steel wire, ensures elastic compliance in the direction of rotation. As a result of the annular design of the spring element 50, the necessary spring excursion, particularly where small shaft diameters are concerned, is also obtained. Within the scope of this invention, the spring element 50 is preferably arranged in an annular groove 62 in the bearing housing 6. By means of this groove 62, not only is the fixing of the spring element 50 ensured, but also, according to the invention, damping occurs as a result of the friction of the spring element 50 in this groove 62. It may be noted that the retaining ring 30, which is likewise arranged in an annular groove at the other end of the sleeve 26, serves solely for axial fixing and executes virtually no relative movement in relation to the bearing housing. In contrast thereto, the spring element 50 which engages, on the one hand, in the sleeve 26 by means of the axially bent end 52 and, on the other hand, in the bearing housing 6 by means of the radially bent end 58, allows elastic movability, so that a damping of vibrations is obtained as a result of friction. Because the element 50 is made resiliently elastic, the distance between the ends 52 and 58 can decrease, for example when there is an increase in rotational speed, thereby producing relative movements of the spring element 50 in the groove 62, these movements resulting in frictional damping in a surprisingly simple way.

Figure 3:
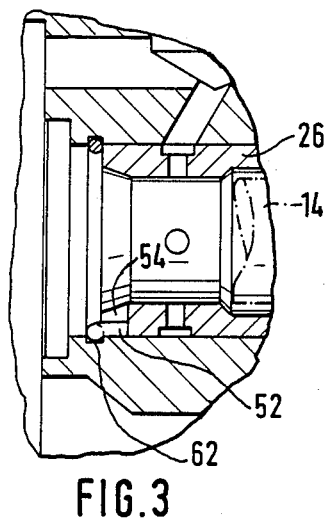
FIG. 3 shows a section taken along section line B—B in FIG. 2.

FIG. 3 shows a partial section taken along section line B—B. This section corresponds to an enlargement of the corresponding cutout from FIG. 1. The spring element 50 is fixed in the annular groove 62 and engages by means of the axially bent first end 52 into the already explained groove 54 in the sleeve 26. The radially bent second end of the spring element 50 is located outside the plane of the drawing and is not shown here for the sake of clarity.

Figure 4:
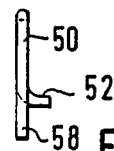
FIGS. 4 and 5 show views of a preferred spring element in the axial and radial directions, respectively.
Figure 5:
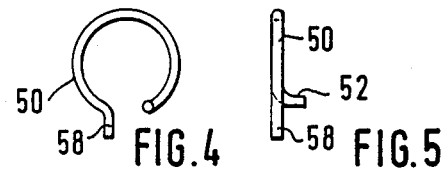

The spring element 50 is shown in an axial view in FIG. 4 and also in a radial view in FIG. 5. In FIG. 4, the radially outwardly bent second end 58 can be seen clearly. FIG. 5 shows both the axially bent first end 52 and the radially outwardly bent second end 58 of the spring element 50.

The foregoing description has been set forth merely to illustrate the invention and is not intended to be limiting. Since modifications of the described embodiment incorporating the spirit and substance of the invention may occur to persons skilled in the art, the scope of the invention is to be limited solely with respect to the appended claims and equivalents.

I claim:

1. A bearing for an exhaust-gas turbocharger comprising a bearing housing defining a bore and a recess opening into said bore, a sleeve arranged in a floating manner in said bore for radially mounting a turbocharger shaft, said sleeve having a bushing portion with an inner bearing face and an outer bearing face at each of its two axial end regions and webs joining said bushing portions defining at least two openings axially between the bushing portions, and means arranged in said bearing housing for preventing rotation of said sleeve around said shaft, said rotation preventing means comprising an at least substantially annular spring element which is elastic in the circumferential direction and which has a first end which engages in a groove in said sleeve and a second end which engages in said recess in said bearing housing.

2. A bearing for an exhaust-gas turbocharger as claimed in claim 1, wherein said spring element is arranged in an annular groove in said bearing housing.

3. A bearing for an exhaust-gas turbocharger as claimed in claim 1, wherein the groove in said sleeve is oriented substantially parallel to the axis of said sleeve.

4. A bearing for an exhaust-gas turbocharger as claimed in claim 1, wherein said first end of said annular spring element is bent so it extends in the axial direction of said sleeve, and said second end of said spring element is bent so it extends radially outwardly beyond said sleeve.

5. A bearing for an exhaust-gas turbocharger as claimed in claim 1, wherein said spring element extends through an angular sector of substantially 360° around the longitudinal axis of said shaft.

6. A bearing for an exhaust-gas turbocharger as claimed in claim 1, wherein said spring element is disposed adjacent one axial end face of said sleeve, and a retaining element is provided at the other axial end of said sleeve, said sleeve being freely moveable axially between said spring element and said retaining element with axial play.

7. A bearing for an exhaust-gas turbocharger as claimed in claim 1, wherein the ratio of the length of the inner bearing face parallel to the sleeve axis to the length of the outer bearing face of each bushing portion is from 0.25 to 0.5:1.

8. A bearing for an exhaust-gas turbocharger as claimed in claim 1, wherein the ratio of the length of the inner bearing face of each bushing portion parallel to the bearing axis to the inside diameter of said bushing portion is from 0.3 to 0.5:1.

9. A bearing for an exhaust-gas turbocharger as claimed in claim 1, wherein said openings are defined between said webs, and the webs each extend over a substantially smaller circumferential region than the openings between the webs.

10. A bearing for an exhaust-gas turbocharger as claimed in claim 1, wherein said webs are of essentially the same length in the axial direction as the outer bearing faces of said bushing portions.

11. A bearing for an exhaust-gas turbocharger as claimed in claim 1, wherein a widened portion adjoins the inner bearing face towards the center of each of said webs.

12. A bearing for an exhaust-gas turbocharger as claimed in claim 11, wherein said widened portion has essentially the same axial length as the inner bearing faces of said bearing portions.

13. A bearing for an exhaust-gas turbocharger as claimed in claim 1, further comprising means for supplying lubricant to each bearing face.

14. A bearing for an exhaust-gas turbocharger as claimed in claim 13, wherein each lubricant supplying means comprises a feed bore in said housing leading from a source of oil under pressure to the outer surface of a bushing portion, an annular groove in the outer surface of said bushing portion aligned with said feed bore, and a plurality of radial bores spaced around the circumference of said bushing portion leading from said annular groove to the inner bearing face on the inner surface of said bushing portion.

15. A bearing for an exhaust-gas turbocharger as claimed in claim 1, wherein said sleeve is arranged in the bearing housing in such a way that said webs are disposed laterally of said shaft essentially in a horizontal plane, and said openings are arranged above and below said shaft.

16. A bearing for an exhaust-gas turbocharger as claimed in claim 1, wherein said recess in said bearing housing opens into said bore in a radial direction relative to said shaft.

* * * * *